US007145671B2

(12) United States Patent
Phillips et al.

(10) Patent No.: US 7,145,671 B2
(45) Date of Patent: Dec. 5, 2006

(54) IMAGE FORMING DEVICES, METHODS OF OPERATING AN IMAGE FORMING DEVICE, A METHOD OF PROVIDING CONSUMABLE INFORMATION, AND A METHOD OF OPERATING A PRINTER

(75) Inventors: Quintin T. Phillips, Boise, ID (US); Bernhard Bette, Sindelfingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 935 days.

(21) Appl. No.: 09/932,039

(22) Filed: Aug. 16, 2001

(65) Prior Publication Data

US 2003/0035128 A1 Feb. 20, 2003

(51) Int. Cl.
*G06F 15/00* (2006.01)
*G06K 15/00* (2006.01)

(52) U.S. Cl. ........................................ 358/1.14; 358/1.1

(58) Field of Classification Search ................ 358/1.14; 347/7; 399/24, 25, 27, 8, 12, 111, 262, 29, 399/30, 31, 81, 58, 61, 43
See application file for complete search history.

(56) References Cited

U.S. PATENT DOCUMENTS

| 4,551,000 | A | | 11/1985 | Kanemitsu et al. |
|---|---|---|---|---|
| 5,272,503 | A | | 12/1993 | LeSueur et al. |
| 5,491,540 | A | | 2/1996 | Hirst |
| 5,706,037 | A | * | 1/1998 | McIntyre ........................ 347/3 |
| 5,758,224 | A | | 5/1998 | Binder et al. |
| 5,802,420 | A | * | 9/1998 | Garr et al. ..................... 399/27 |
| 5,873,009 | A | | 2/1999 | Yamashita et al. |
| 5,937,225 | A | * | 8/1999 | Samuels ........................ 399/27 |
| 6,028,674 | A | * | 2/2000 | Tognazzini ................. 358/1.13 |
| 6,035,295 | A | * | 3/2000 | Klein ............................. 707/6 |
| 6,266,493 | B1 | * | 7/2001 | Farrell et al. .................. 399/24 |
| 6,471,314 | B1 | * | 10/2002 | Doi ................................ 347/5 |
| 6,584,291 | B1 | * | 6/2003 | Yamamoto .................... 399/27 |
| 6,609,212 | B1 | * | 8/2003 | Smith ............................ 714/4 |
| 6,658,219 | B1 | * | 12/2003 | Ito et al. ........................ 399/27 |
| 6,672,695 | B1 | * | 1/2004 | Naka et al. ..................... 347/7 |
| 6,903,837 | B1 | * | 6/2005 | Moreau et al. ............. 358/1.15 |

OTHER PUBLICATIONS

U.S. Appl. No. 09/480,546; "Printer Cartridge with Memory to Optimize Printer Settings For Use With The Printer Cartridge"; Filed Jan. 10, 2000.
U.S. Appl. No. 09/479,958; "Storage of Printing Device Usage Data On A Printing Device Replaceable Component"; Filed Jan. 10, 2000.
U.S. Appl. No. 09/479,957; "Dynamic Messaging Utilizing Replaceable Printer Components"; Filed Jan. 10, 2000.
U.S. Appl. No. 09/602,640; "Image Forming Systems and Methods of Forming and Image"; Filed Jun. 22, 2000.

* cited by examiner

Primary Examiner—Gabriel Garcia

(57) ABSTRACT

Image forming devices, consumables and methods of operating an image forming device are described. According to one aspect, an image forming device includes an image engine configured to use a consumable to form a hard image; and processing circuitry coupled with the image engine configured to: perform prediction operations with respect to the consumable to predict a likelihood that an image job will be imaged; receive a change of use indication with respect to the consumable; and modify the prediction operations responsive to the change of use.

31 Claims, 3 Drawing Sheets

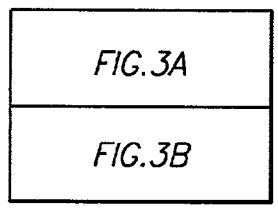
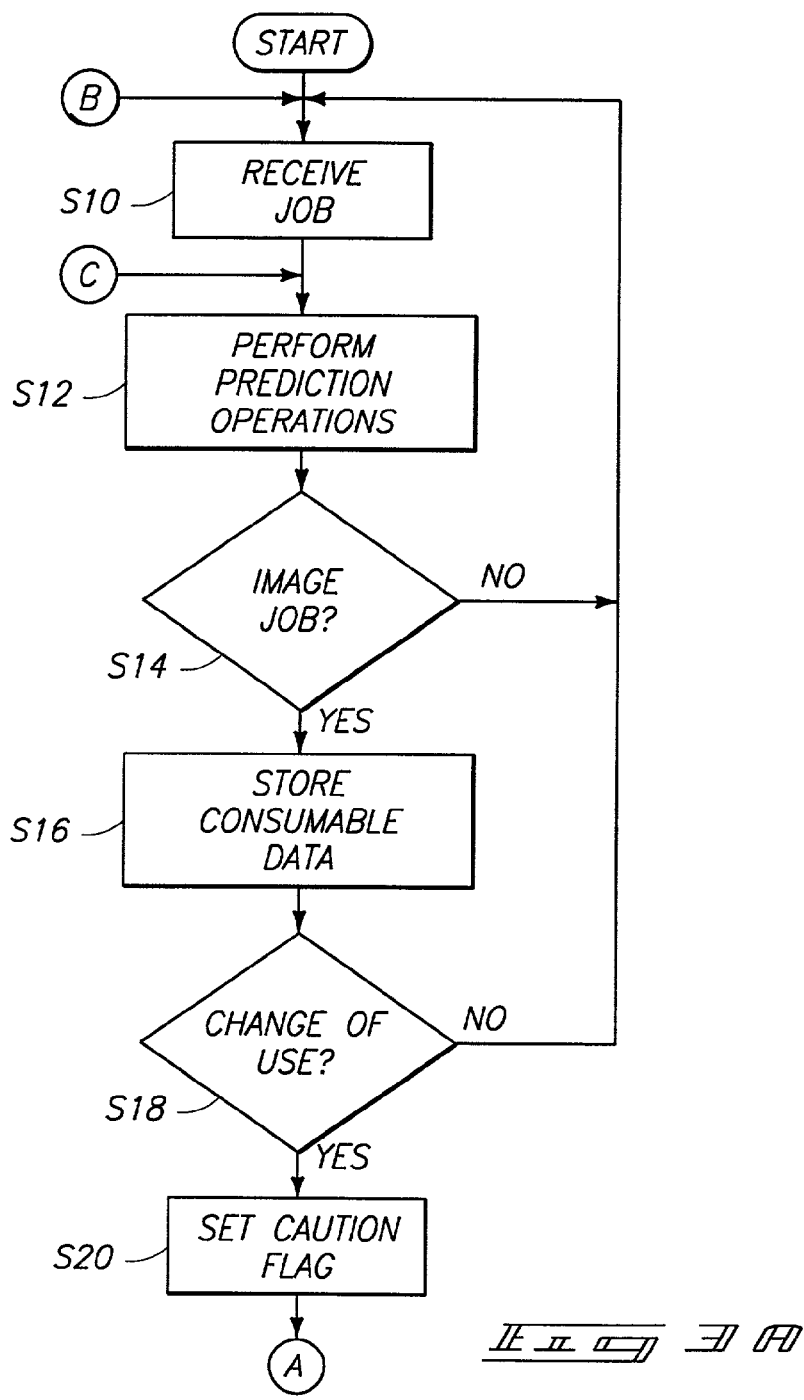

IMAGE FORMING DEVICES, METHODS OF OPERATING AN IMAGE FORMING DEVICE, A METHOD OF PROVIDING CONSUMABLE INFORMATION, AND A METHOD OF OPERATING A PRINTER

FIELD OF THE INVENTION

This invention relates to image forming devices, methods of operating an image forming device, a method of providing consumable information, and a method of operating a printer.

BACKGROUND OF THE INVENTION

Modern printers have been configured to communicate with memory devices provided upon consumables which are utilized by the printers. The consumables are utilized by the printers during the formation of hard images. The printers are configured to communicate with the memory devices provided upon the consumables to write data thereto and to receive data therefrom. Data upon the memory devices can include information regarding the consumable as well as information regarding operations of the printer. The stored data is generally utilized to enhance the operation of the associated printer. Exemplary enhancements of printer functionality include provision of features to predict end of life or pages remaining with respect to the consumable using data stored upon the memory device.

In typical applications, printers and/or consumables may be physically relocated or associated with a different use pattern. One example occurs with high volume printing wherein the consumable is indicated to be near an end of life, however some quantity of the consumable remains. In such situations, the consumable may be transferred to a low volume application to expend the remaining life of the consumable. Such printer load balancing attempts to match changing work loads with the printer and/or consumable resources available.

Some printers are configured to perform predictive operations with respect to the consumable based upon previous usage. A change of use of the consumable or the printer may result in erroneous prediction operations being performed with respect to the consumable. For example, prediction of a likelihood that an image job will be completed using the consumable may be based upon previous usage of the consumable, and the usage may change during load balancing or for other reasons. Although some predictive capabilities include self-teaching or self-correcting algorithms, such typically require some time before identifying of the change of use and accounting for the change of use. In the meantime, erroneous predictions may occur based upon the previous usage information.

There exists a need to provide improved devices and methodologies which accommodate changes in usage of consumables.

SUMMARY OF THE INVENTION

Image forming devices, methods of operating an image forming device, a method of providing consumable information, and a method of operating a printer are provided.

According to one aspect, an image forming device comprises an image engine configured to use a consumable to form a hard image; and processing circuitry coupled with the image engine configured to: perform prediction operations with respect to the consumable to predict a likelihood that an image job will be imaged; receive a change of use indication with respect to the consumable; and modify the prediction operations responsive to the change of use.

According to another aspect, a method of operating an image forming device configured to use a consumable to form a hard image includes performing prediction operations with respect to a consumable to predict a likelihood that an image job will be imaged; indicating a change of use of the consumable; and modifying the prediction operations with respect to the consumable after the indicating the change of use.

Another aspect provides a method of providing consumable information comprising: providing a consumable usable to form hard images; storing predictive data concerning usage of the consumable upon the consumable to enable prediction operations to predict a likelihood that an image job will be imaged using the consumable; and setting a warning indication upon the consumable and associated with the predictive data to indicate a change of use of the consumable and to warn a user of a suspect nature of the predictive data.

Yet another aspect provides a method of operating a printer configured to use a consumable to form hard images comprising: printing a plurality of hard images; storing predictive data regarding usage of a consumable responsive to the printing, wherein the storing predictive data comprises storing upon a memory of the consumable; storing historical data regarding usage of the consumable responsive to the printing, wherein the storing historical data comprises storing upon the memory; performing prediction operations with respect to the consumable using the predictive data and the historical data to predict a likelihood that an image job will be imaged using the consumable; indicating a change of use of the consumable after the performing; verifying the change of use of the consumable after the indicating; resetting the predictive data after the verifying; maintaining the historical data during the resetting; acquiring subsequent predictive data after the resetting; establishing confidence in the prediction operations after the resetting; and performing subsequent prediction operations after the establishing confidence using the historical data and the subsequent predictive data.

The present invention includes additional aspects, some of which are described below.

Other features and advantages of the invention will become apparent to those of ordinary skill in the art upon review of the following detailed description, claims, and drawings.

DESCRIPTION OF THE DRAWINGS

FIGS. 3A and 3B are a flow chart depicting an exemplary method of operating the image forming device.

DETAILED DESCRIPTION OF PREFERRED EMBODIMENTS

Figure 1:
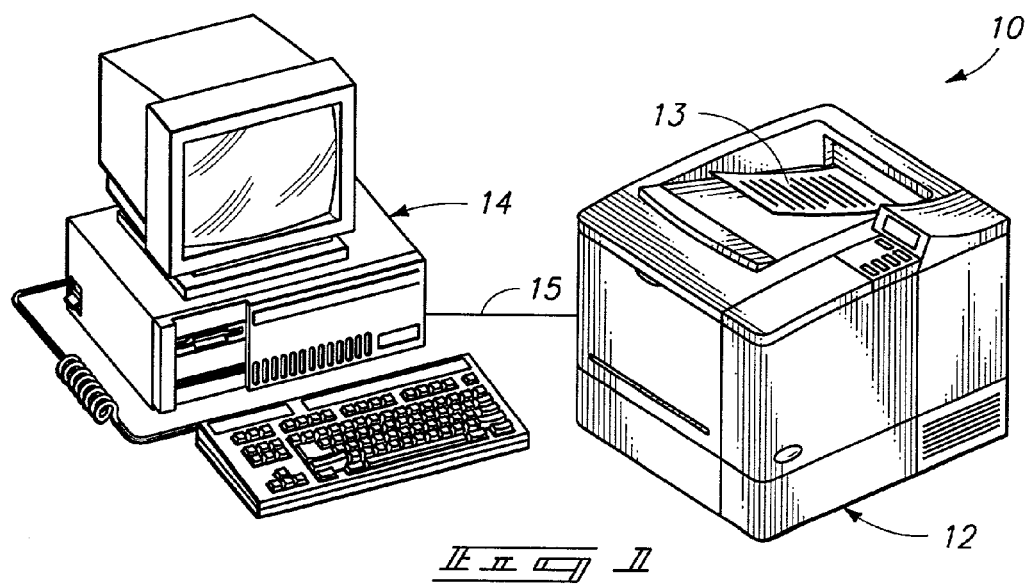
FIG. 1 is an illustrative representation of an image forming system.

FIG. 1 depicts an exemplary image forming system 10 including one or more image forming device 12 and one or more host device 14 (only one image forming device 12 and one host device 14 are depicted in FIG. 1). Image forming device 12 and host device 14 are configured to communicate via an appropriate medium 15 including for example, a network, parallel connection, etc.

Image forming device 12 utilizes one or more consumable to form hard images. Exemplary consumables utilized within a given image forming device include imaging media (e.g., paper, transparencies, etc.), marking agents (e.g., toner), components having fixed life spans (e.g., developer assembly) and other expendable items utilized to complete desired jobs.

Exemplary image forming devices 12 include printers, facsimile devices, copiers, multiple-function devices or other devices capable of forming hard images upon media 13, such as paper, labels, transparencies, roll media, etc. Exemplary hard images includes images provided upon output media and comprise printed media in one example.

An exemplary host device 14 is implemented as a personal computer having an Intel™ processor or AMD™ processor (not shown). Host device 14 provides data to be imaged to image forming device 12. Host device 14 may also be utilized to reconfigure or control operations of image forming device 12. Other host device 14 configurations are possible.

Figure 2:
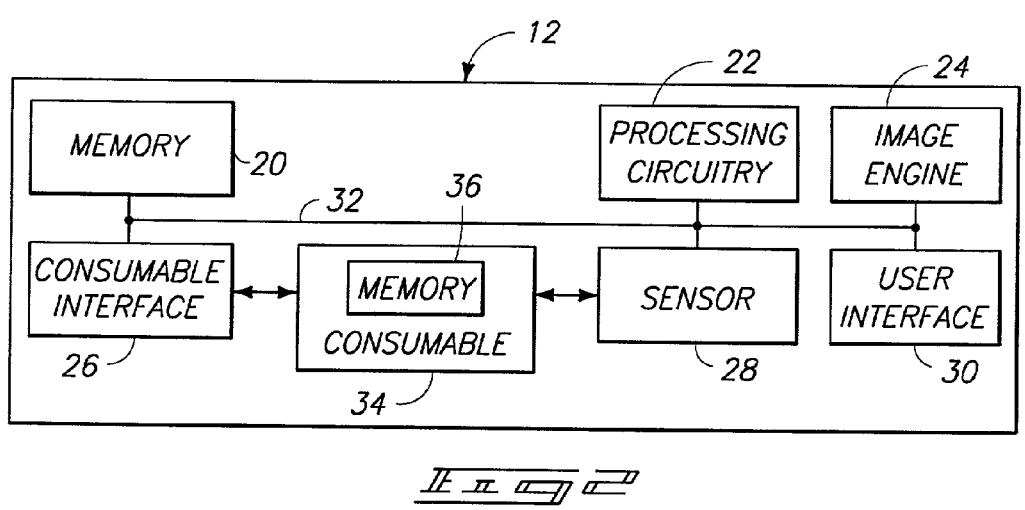
FIG. 2 is a functional block diagram depicting components of an exemplary image forming device of the image forming system.

Referring to FIG. 2, components of an exemplary image forming device 12 are depicted. Some of the depicted components are optional and other arrangements of image forming device 12 configured to form hard images are possible. The exemplary embodiments disclosed herein are discussed with reference to a printer application although the present invention applies to any image forming device configuration capable of forming hard images.

As shown, the exemplary image forming device 12 includes a memory 20, processing circuitry 22, an image engine 24, a consumable interface 26, a sensor 28 and a user interface 30. A bus 32 is configured to implement bidirectional communications between the respective components of image forming device 12.

Memory 20 is configured to store executable instructions configured to cause processing circuitry 22 to control operations of image forming device 12. Memory 20 is further configured to store digital data usable within device 12. For example, memory 20 is configured to store image data to be imaged using image engine 24, executable instructions usable by processing circuitry 22 to implement imaging operations and to control operations of image forming device 12, as well as other digital data to be stored within image forming device 12. Exemplary memory comprises a hard disk, random access memory (RAM), read only memory (ROM) and/or flash memory in but one exemplary embodiment.

Image engine 24 implements formation of hard images upon media 13. According to the exemplary described printer embodiment, image engine 24 is implemented as a print engine. An exemplary print engine includes a developing assembly and a fuser assembly (not shown) to respectively form hard images using marking or developing agents and to affix the agents to media 13. Other construction or embodiments of image engine 24 are possible.

Processing circuitry 22 is configured to execute executable instructions to control operations of image forming device 12. Processing circuitry 22 is configured to implement operations described herein with respect to monitoring consumable usage and performing prediction operations with respect to consumables, such as predicting remaining capacity of consumables. Processing circuitry 22 is configured to execute executable instructions stored within memory 20 comprising, for example, software and/or firmware instructions. Exemplary processing circuitry 22 is implemented as a microprocessor in one exemplary embodiment.

Consumable interface 26 is configured to couple with a consumable 34 to establish communications therewith. An exemplary consumable 34 includes a memory 36 to store digital information. Exemplary memory 36 includes RAM, flash memory or other configurations. Consumable 34 may be implemented as a toner cartridge including a memory tag, for example. In other configurations, consumable 34 does not include memory 36.

Consumable interface 26 is utilized to write data to memory 36 of consumable 34 and to retrieve data therefrom. Exemplary communications between consumable interface 26 and consumable 34 are described in U.S. Pat. No. 5,491,540, which is incorporated herein by reference.

Sensor 28 is configured to monitor a status of consumable 34 and to output information regarding the status to processing circuitry 22 or other appropriate components. Sensor 28 may be configured to weigh the consumable 34, optically monitor a remaining amount of consumable 34 or monitor the status of consumable 34 in any appropriate method. Additionally, processing circuitry 28 may be utilized to monitor a status of consumable 34 by counting pixels during generation of images, for example. Processing circuitry 22 operates to store historical data regarding the usage of the consumable during the formation of hard images using memory 20 and/or memory 36. Exemplary historical data includes, for example, a remaining quantity of consumable 34.

User interface 30 is implemented as a control panel and a display in the described embodiment. A user inputs commands and other information via the control panel and processing circuitry 22 controls the display to depict status and other messages pertinent to image forming device 12 (the control panel and display of user interface 30 are not shown). A user interface is implemented using software resident upon the host device 14 in another arrangement to allow a user to input commands and other information.

Image forming system 10 is configured to monitor usage of a consumable within image forming device 12. Data is gathered and stored regarding usage of consumables to image jobs. Information regarding the imaging of jobs is stored as historical data. The historical data includes information regarding usage of consumables within image forming device 12. For example, exemplary historical data includes a total amount of a consumable utilized, a total number of pages imaged, and other measurable or quantifiable information with respect to consumable usage or consumable remaining capacity.

In addition, image forming system 10 is configured to implement predictive operations with respect to consumable usage. For example, image forming system 10 may utilize historical data to derive predictive data to predict the likelihood that an image job will be imaged. For example, processing circuitry 22 may use the historical data such as the amount of consumable used per page of past jobs and the amount of consumable remaining to derive predictive data, such as an estimation that fifty pages remain for imaging using the respective consumable 34. Processing circuitry 22 analyzes the number of pages of the imaging job with respect to the predictive data (e.g., page estimation) to determine the likelihood that a job will be imaged.

If there is a likelihood of a job not being completed, image forming system 10 can alert a user who can take appropriate action, such as choosing another image forming device. Historical data and predictive data may be stored upon memory 20 of device 12 and/or upon memory 36 of consumable 34 or upon another appropriate device such as host device 14.

Exemplary operations with respect to image forming devices 12 including storage of historical and predictive data and performing prediction operations are described in U.S. patent application Ser. No. 09/480,546, filed Jan. 10, 2000, entitled "Printer Cartridge with Memory to Optimize Printer Settings for Use with the Printer Cartridge", and listing Quintin T. Phillips, Robert E. Haines, Darius Boockholdt, Joseph L. Burquist and Mark A. Harper as inventors; U.S. patent application Ser. No. 09/479,958, filed Jan. 10, 2000, entitled "Storage of Printing Device Usage Data on a Printing Device Replaceable Component", and listing Robert E. Haines, Quintin T. Phillips, Darius Boockholdt, Joseph L. Burquist, Mark A. Harper, Santiago Rodriguez, and L. Trent Christensen as inventors; U.S. patent application Ser. No. 09/602,640, filed Jun. 22, 2000, entitled "Image Forming Systems and Methods of Forming an Image", and listing Quintin T. Phillips, Darius Boockholdt, Robert E. Haines, Mark A. Harper and Mary Baumunk as inventors; and U.S. patent application Ser. No. 09/479,957, filed Jan. 10, 2000, entitled "Dynamic Messaging Utilizing Replaceable Printer Components", and listing Quintin T. Phillips, Robert E. Haines, Mary Baumunk, Jake Heusinkveld and Darius Boockholdt, as inventors, all of which are incorporated herein by reference.

During usage of image forming systems 10, changes of use occur from time to time. Such may result from unforseen circumstances or for specific desires such as for load balancing. Changes of use may affect an image forming device 12 and\or a consumable 34 utilized within image forming devices. For example, the image forming device 12 and\or consumable 34 may be utilized in a given environment (e.g., graphic arts) for a period of time. Thereafter, the image forming device 12 and\or the consumable 34 may be utilized in another application, such as a low consumable usage application (e.g., executive word processing). Other changes of use are possible.

Following a change of use for any given reason, aspects of the present invention enable a change of use to be indicated within image forming system 10. In one exemplary instance, a user such as a system administrator using an appropriate host device 14, for example, may apply a change of use (also referred to as a reset) command to the image forming device 12 and/or consumable 34. Alternatively, a user may input a change of use command via user interface 30. Other methods may be utilized to indicate the change of use for the image forming device 12 and/or consumable 34.

Image forming device 12, host device 14 and/or another appropriate device performs prediction operations with respect to imaging of an image job. As described herein, prediction operations with respect to a consumable are modified after a change of use has been indicated. According to aspects of the invention, modification of the prediction operations performed by image forming device 12, host device 14 or other appropriate device include in one exemplary aspect warning a user of the reliability of the prediction operations after a change of use has been indicated.

For example, after receiving a job ticket, image job, or at other convenient moments in time, prediction operations are performed to indicate to a user a likelihood that the job will in fact be imaged. According to this aspect of the present invention, the prediction operation may also be accompanied by a warning that the prediction may not be accurate. Such may be implemented as a pop-up window upon the host device 14, email message, using user interface of image forming device 12 and\or other convenient warning. Accordingly, the user may determine whether or not they wish to proceed in using the selected image forming device or proceed with selecting another available device as described in U.S. patent application Ser. No. 09/602,640, incorporated by reference above.

In other aspects, a change of use indication or flag is associated with the predictive data stored in memory by processing circuitry 22. Accordingly, the flag is accessed with predictive data and a warning may be issued with the prediction operations which use the predictive data having the associated flag.

According to other aspects of the invention, modification of prediction operations includes suspension of such prediction operations for a predefined period of time. In addition to such suspension of prediction operations, a warning may also be forwarded to a user indicating the change of use and the suspension of operations.

Further, and according to additional aspects, predictive data may be reset following the indication of a change of use. For example, such predictive data may be reset in memory 36 or other appropriate location to prevent erroneous future predictions. The historical data may be retained for further use operations. Alternatively, the historical data is reset as well. Following a change of use indication, the prediction data is suspect because assumptions are made during prediction operations based upon usage of the consumable in a given application. Subsequent imaging operations in a different application may utilize the consumable in a different manner such that the assumptions made from the previous usage for prediction are no longer valid. Accordingly, prediction operations are modified following a change of use indication in aspects of the present invention to avoid erroneous prediction operations.

In most arrangements, the suspension of prediction operations is temporary. For example, according to some aspects, the suspension of prediction operations occurs until confidence is reestablished for the prediction operations wherein the prediction operations are reenabled. In one embodiment, processing circuitry 22 monitors a number of image jobs imaged after the receipt of a change of use indication. After a predetermined number of jobs have been imaged, new predictive data is available since the change of use to establish confidence in the prediction operations and the statistical analysis associated therewith. Thereafter, the prediction operations may be reenabled to again provide prediction functionality with increased accuracy utilizing predictive and historical data regarding consumable usage after the previously indicated change of use. According to one arrangement, the historical data compiled before the modification may also be utilized during subsequent prediction operations.

According to other aspects of the invention, a verification period may be performed following an indicated change of use. For example, following the receipt of a change of use indication, prediction operations are associated with an appropriate warning and one or more image job is monitored to determine whether a change of use has in fact occurred. Processing circuitry 22 may compare consumable usage during such one or more image job with usage before the change of use indication to determine whether the indication was proper. The length of time of the verification operation (i.e., the number of image jobs analyzed during the verification operation) may be varied. During such verification period, appropriate warnings as described above are implemented according to some embodiments to alert users to the possible erroneous prediction operations.

If the verification period determines that a change of use has in fact occurred, the prediction operations are modified as described above. Alternatively, if the verification period determines that no change of use occurred, the prediction operations are resumed as if the indication was not received. Other verification methodologies are possible.

Figure 3B:
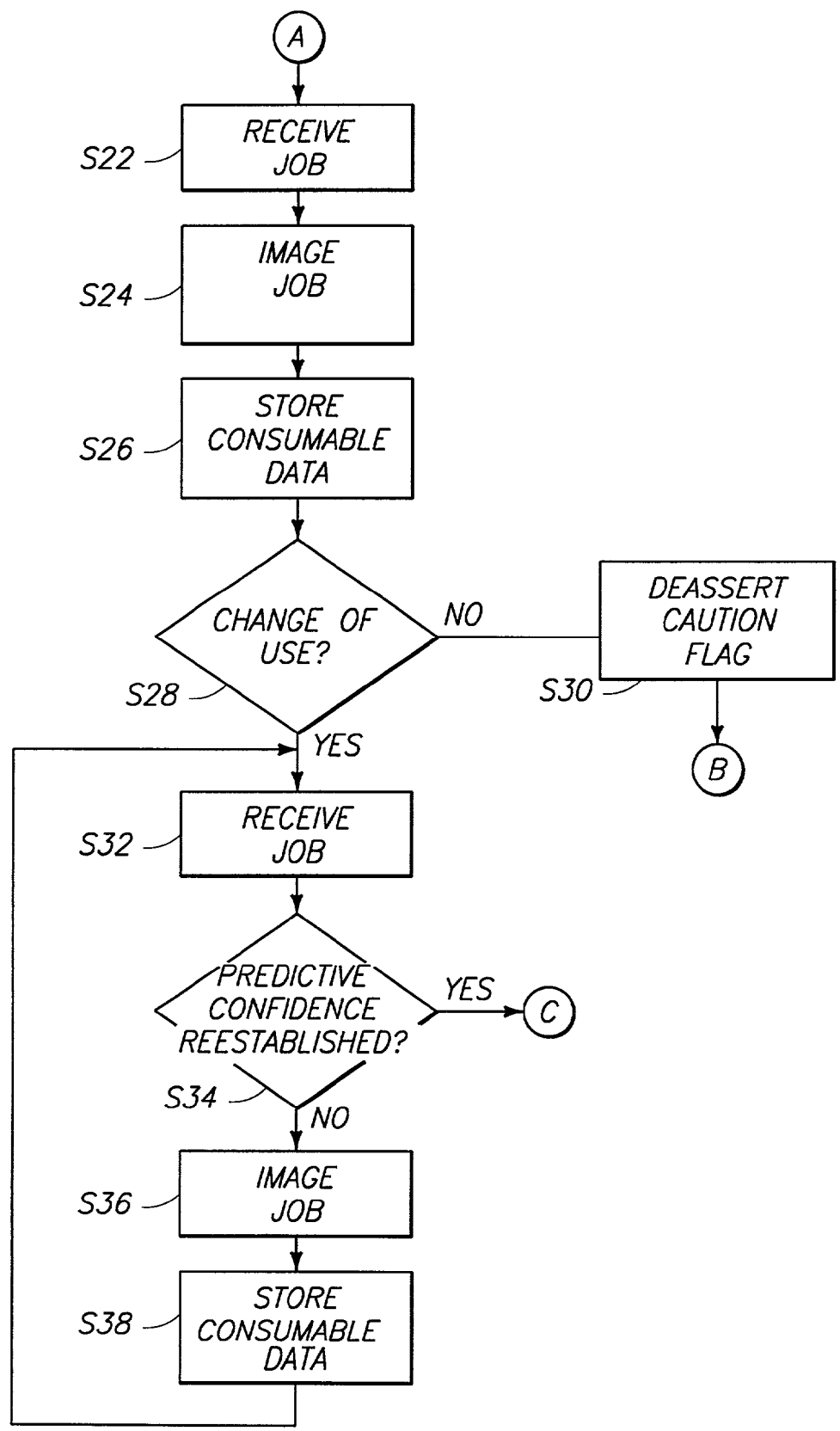

Referring to FIGS. 3A and 3B, an exemplary methodology performed within one or more image forming device 12 and/or host device 14 is illustrated. For example, executable instructions which cause processing circuitry 22 to perform the depicted methodology may be stored within memory 20.

Initially, at a step S10, processing circuitry 22 determines whether an image job has been received.

Following receipt of an appropriate image job, processing circuitry 22 proceeds to a step S12 to perform prediction operations with respect to a likelihood that the image job will be imaged.

At a step S14, processing circuitry 22 determines whether the job will be imaged according to the prediction operations.

If the condition of step S14 is negative, processing circuitry 22 returns to step S10, or performs other functionality such as polling the user whether they wish to proceed with the imaging wherein the job is imaged.

If the condition of step S14 is affirmative and the job is imaged, processing circuitry 22 proceeds to a step S16 wherein data regarding imaging of the job is stored. For example, the amount of toner or other consumable utilized per pixel and/or page, as well as the number of pixels and pages imaged may be stored.

At a step S18, processing circuitry 22 monitors for the reception of a change of use indication.

If the condition of step S18 is negative, processing circuitry 22 returns to step S10.

If the condition of step S18 is affirmative, processing circuitry 22 proceeds to a step S20 to assert a caution flag. The caution flag or other indication is associated with future prediction operations and/or predictive data to indicate a suspect nature of subsequent prediction operations until confidence is established. The caution flag may be stored upon memory 36 according to one exemplary aspect.

At a step S22, another subsequent image job is received.

At a step S24, processing circuitry 22 proceeds to image the received job. Processing circuitry 22 may perform a prediction operation at step S24 with a warning as indicated by the caution flag prior to imaging the job if desired.

At a step S26, processing circuitry 22 is configured to store data regarding usage of the consumable to image the job at step S24.

At a step S28, processing circuitry 22 performs verification operations to determine whether a change of use has in fact occurred. In the described embodiment, processing circuitry 22 utilizes the results from step S26 to analyze the change of use situation. According to other aspects of the invention, steps S22, S24 and S26 may be repeated a predetermined number of times to establish enough information to determine whether a change of use is indicated at step S28. If the condition of step S28 is negative, processing circuitry 22 proceeds to a step S30 to deassert the caution flag asserted in step S20 and returns to step S10 to await the reception of another image job.

If the condition of step S28 is affirmative, processing circuitry 22 proceeds to a step S32 to receive a new job.

At a step S34, processing circuitry 22 determines whether predictive confidence has been reestablished.

If so, processing circuitry 22 deasserts the caution flag and returns to a step S12 to perform a prediction operation with respect to the received job.

If the condition of step S34 is negative, processing circuitry 22 proceeds to step S36 to image a job and may perform the prediction operation with a warning prior to imaging the job if desired.

Thereafter, processing circuitry 22 proceeds to a step S38 to store data regarding usage of a consumable to image the image job. Thereafter, processing circuitry 22 returns to step S32.

Other methods embodying aspects of the present invention are possible. In addition, one or more steps depicted in FIGS. 3A and 3B may be omitted according to other methods of the invention.

The protection sought is not to be limited to the disclosed embodiments, which are given by way of example only, but instead is to be limited only by the scope of the appended claims.

What is claimed is:

1. An image forming device comprising:
   an image engine configured to use a consumable to form a hard image; and processing circuitry coupled with the image engine and configured to:
   perform prediction operations with respect to the consumable to predict a likelihood that an image job will be imaged;
   receive a change of use indication with respect to the consumable;
   modify the prediction operations responsive to the change of use;
   wherein the processing circuitry is configured to suspend the prediction operations to modify the prediction operations; and
   wherein the processing circuitry is configured to establish confidence in the prediction operations after the suspension and to reenable the prediction operations after the establishment of confidence.

2. The device of claim 1 further comprising a memory configured to store predictive date regarding usage of the consumable responsive to the formation of hard images, and wherein the processing circuitry is configured to access the predictive data to perform the prediction operations.

3. The device of claim 2 wherein the processing circuitry is configured to reset the predictive data to modify the prediction operations, and wherein the memory is configured to store subsequent predictive data after the resetting, and the processing circuitry is configured to use the subsequent predictive data after the resetting to perform subsequent prediction operations after the resetting.

4. The device of claim 2 wherein the processing circuitry is configured to set a change of use warning associated with the predictive data to modify the prediction operations.

5. The device of claim 2 wherein the memory is located upon the consumable.

6. The device of claim 1 further comprising a memory configured to store historical data regarding usage of the consumable responsive to the formation of hard images, and wherein the processing circuitry is configured to use the historical data to perform the prediction operations and to maintain the historical data after the change of use.

7. The device of claim 1 wherein the processing circuitry is configured to verify the change of use indication responsive to receiving the change of use indication, and to modify the prediction operations responsive to the verification.

8. The device of claim 1 wherein the processing circuitry is configured to perform the prediction operations comprising comparing a number of pages of the image Job to be imaged with the predictive data indicative of a remaining supply of the consumable.

9. The device of claim 1 wherein the change of use indication is responsive to a change in environment from a first type of printing environment to a second type of printing environment different than the first type of printing environment.

10. The device of claim 9 wherein the image forming device is changed from the first type of printing environment to the second type of printing environment.

11. The device of claim 1 wherein the processing circuitry is configured to access data indicative of an amount of the consumable used to print a single sheet of paper to perform the prediction operations.

12. The device of claim 1 wherein the processing circuitry is configured to utilize a number of pages of the image job to be imaged to perform the prediction operations to predict the likelihood that the image job will be imaged.

13. The device of claim 1 wherein the processing circuitry is configured to perform the prediction operations responsive to the provision of the image job for imaging using the image engine.

14. The device of claim 1 wherein the processing circuitry is configured to control the image engine to form hard images of image jobs during suspension of the prediction operations.

15. The device of claim 1 wherein the processing circuitry is configured to perform the prediction operations to predict a likelihood that the image job will be imaged by the image forming device responsive to reception of the image job by the image forming device and prior to beginning of the imaging of the image job upon media by the image forming device.

16. The device of claim 1 wherein the change of use indication indicates a change as to how the consumable will be used.

17. The device of claim 16 wherein the change of use indication is with respect to the same consumable item before and after a change of use of the consumable item.

18. A method of operating an image forming device configured to use a consumable to farm a hard image, the method comprising:
    performing prediction operations with respect to a consumable to predict a likelihood that an image job will be imaged;
    indicating a change of use of the consumable;
    modifying the prediction operations with respect to the consumable after the indicating the change of use, wherein the modifying the prediction operations comprises suspending the prediction operations;
    establishing confidence in the prediction operations after the modifying; and
    reenabling the prediction operations with respect to the consumable after establishing confidence.

19. The method of claim 18 further comprising storing predictive data regarding usage of the consumable, and wherein the performing comprises performing the prediction operations using the predictive data.

20. The method of claim 19 wherein the modifying comprises resetting the predictive data, and further comprising acquiring subsequent predictive data after the resetting, and performing subsequent prediction operations using the predictive data acquired after the resetting.

21. The method of claim 19 wherein the modifying comprises setting a change of use warning indication associated with the predictive data.

22. The method of claim 19 wherein the storing comprises storing the predictive data upon a memory of the consumable.

23. The method of claim 18 further comprising storing historical data regarding usage of a consumable, and wherein the performing the prediction operations comprises performing using the historical data, and further comprising maintaining the historical data during the modifying.

24. The method of claim 18 further comprising verifying the change of use of the consumable, and wherein the modifying is responsive to the verifying.

25. The method of claim 18 further comprising moving the consumable from a first image forming device to a second image forming device. and wherein the indicating is responsive to the moving.

26. The method of claim 18 further comprising accessing information regarding a number of pages of the image job to be imaged, and wherein the performing comprises performing the prediction operations using the number of pages.

27. The method of claim 26 further comprising accessing data indicative of a remaining supply of the consumable, and wherein the performing comprises comparing the number of pages of the image job to be imaged with the data.

28. The method of claim 18 further comprising providing a request to image the image job and wherein the performing is responsive to the request.

29. A method of providing consumable information comprising:
    providing a consumable usable to form hard images;
    storing predictive data concerning usage of the consumable upon the consumable to enable prediction operations to predict a likelihood that an image lob will be imaged using the consumable; and
    setting a warning indication upon the consumable and associated with the predictive data to indicate a change of use of the consumable and to warn a user of a suspect nature of the predictive data.

30. A method of operating printer configured to use a consumable to farm hard images, the method comprising:
    printing a plurality of hard images;
    storing predictive data regarding usage of a consumable responsive to the printing, wherein the storing predictive data comprises storing upon a memory of the consumable;
    storing historical data regarding usage of the consumable responsive to the printing, wherein the storing historical data comprises storing upon the memory;
    performing prediction operations with respect to the consumable using the predictive data and the historical data to predict a likelihood that an image job will be imaged using the consumable;
    indicating a change of use of the consumable after the performing;
    verifying the change at use of the consumable after the indicating;
    resetting the predictive data after the verifying;
    maintaining the historical data during the resetting;
    acquiring subsequent predictive data after the resetting;
    establishing confidence in the prediction operations after the resetting; and
    performing subsequent prediction operations after the establishing confidence using the historical data and the subsequent predictive data.

31. An image forming device comprising:
an image engine configured to use a consumable to form a hard image; and
processing circuitry coupled with the image engine and configured to:
  perform prediction operations with respect to the consumable to predict a likelihood that an image job will be imaged;
  receive a change of use indication with respect to the consumable;
  modify the prediction operations responsive to the change of use; and
wherein the processing circuitry is configured to perform the prediction operations to predict a likelihood that the image job will be imaged by the image forming device responsive to reception of the image job by the image forming device and prior to beginning of the imaging of the image job upon media by the image forming device.

* * * * *

UNITED STATES PATENT AND TRADEMARK OFFICE
CERTIFICATE OF CORRECTION

PATENT NO. : 7,145,671 B2  Page 1 of 1
APPLICATION NO. : 09/932039
DATED : December 5, 2006
INVENTOR(S) : Quintin T. Phillips et al.

It is certified that error appears in the above-identified patent and that said Letters Patent is hereby corrected as shown below:

In column 8, line 40, in Claim 2, delete "date" and insert -- data --, therefor.

In column 9, line 1, in Claim 8, delete "Job" and insert -- job --, therefor.

In column 9, line 42, in Claim 18, delete "farm" and insert -- form --, therefor.

In column 10, line 14, in Claim 25, delete "device." and insert -- device, --, therefor.

In column 10, line 33, in Claim 29, delete "lob" and insert -- job --, therefor.

In column 10, line 41, in Claim 30, delete "farm" and insert -- form --, therefor.

In column 10, line 57, in Claim 30, delete "at" and insert -- of --, therefor.

Signed and Sealed this

Eighteenth Day of August, 2009

David J. Kappos
*Director of the United States Patent and Trademark Office*